(12) United States Patent
Babonneau et al.

(10) Patent No.: US 8,437,403 B2
(45) Date of Patent: May 7, 2013

(54) DEVICE AND METHOD FOR ANALYSING IMAGES BY CALCULATING THE VARIANCE FOR EACH PIXEL OF A HIGH-FREQUENCY IMAGE

(76) Inventors: Jean-Yves Babonneau, L'Hermitage (FR); Jacky Dieumegard, Paris (FR); Olivier Le Meur, Talensac (FR)

( * ) Notice: Subject to any disclaimer, the term of this patent is extended or adjusted under 35 U.S.C. 154(b) by 1984 days.

(21) Appl. No.: 11/324,857

(22) Filed: Jan. 4, 2006

(65) Prior Publication Data
US 2006/0176958 A1 Aug. 10, 2006

(30) Foreign Application Priority Data
Jan. 5, 2005 (EP) ...................................... 0550026

(51) Int. Cl.
H04N 7/12 (2006.01)
H04N 11/02 (2006.01)
H04N 11/04 (2006.01)

(52) U.S. Cl.
USPC ................................ 375/240.19; 375/240.18

(58) Field of Classification Search .......... 382/232–308; 375/240–254
See application file for complete search history.

(56) References Cited

U.S. PATENT DOCUMENTS

| | | | | |
|---|---|---|---|---|
| 4,494,838 A * | 1/1985 | Wallquist et al. | ............. | 351/206 |
| 5,990,957 A | 11/1999 | Ryoo | | |
| 6,160,846 A | 12/2000 | Chiang et al. | | |
| 6,246,783 B1 * | 6/2001 | Avinash | ............. | 382/128 |
| 7,289,154 B2 * | 10/2007 | Gindele | ............. | 348/364 |
| 2003/0123740 A1 * | 7/2003 | Mukherjee | ............. | 382/239 |
| 2004/0086193 A1 * | 5/2004 | Kameyama et al. | ............. | 382/254 |
| 2004/0126020 A1 * | 7/2004 | Sakuyama et al. | ............. | 382/232 |
| 2004/0208339 A1 * | 10/2004 | Abe et al. | ............. | 382/100 |
| 2004/0237103 A1 * | 11/2004 | Kondo et al. | ............. | 725/37 |
| 2005/0025245 A1 * | 2/2005 | Varma | ............. | 375/240.23 |
| 2005/0259880 A1 * | 11/2005 | Fukuhara et al. | ............. | 382/240 |

FOREIGN PATENT DOCUMENTS

| EP | 0 495 501 A | 7/1992 |
|---|---|---|
| EP | 0 541 302 | 5/1993 |

OTHER PUBLICATIONS

Rubino E M et al. "Improved Chen-Smith Image Coder" Journal of Electronic Imaging, SPIE + IS&T, US vol. 4, No. 2, (Apr. 1, 1995) pp. 151-160, XP000511409 ISSN: 1017-9909 *alinea '02.1!*.

-Rah Wong et al. "Perceptual Rate Control for Low-Delay Video Communications" Multimedia and Expo, 2003. proceedings. 2003, Piscataway, NJ. USA, IEEE, vol. 3, (Jul. 6, 2003), p. 361-364, xpo10651161 ISBN: 0-7803-7965-9 *alineas '0003!, '0004!.

Kim I. et al. "The Block-Based Preprocessing System or the Coding Performance Improvement" IEEE Transactions on Consumer Electronics, IEEE Inc. New York, US, Bvol. 44, No. 2, (Aug. 1998), pp. 1048-1053, XP000851619 ISSN: 0098-3063 *le document en entier*.

(Continued)

Primary Examiner — Douglas Tran

(57) ABSTRACT

A method and device for analysing video images by obtaining high frequency components. The device includes means for obtaining high-frequency components of a video image and means for obtaining a high-frequency image on the basis of the high-frequency components. Means for calculating the variance for each pixel of the high-frequency image. Means for associating a coefficient with each pixel of the video image as a function of the variance. The coefficient is representative of the visual sensitivity of each pixel for the human eye. The invention relates to a method and a device for analysing video images.

10 Claims, 3 Drawing Sheets

OTHER PUBLICATIONS

Vleeschouwer De C et al. "Invisibility and Application Functionalities in Perceptual Watermarking-An OVerview" Proceedings of the IEEE, IEEE. New York, US, vol. 90 No. 1, janvier 2000 (Jan. 2002), pp. 64-77, XP001157370 ISSN: 0018-9219 *alinea 'III. C!*alinea 'IV.B!*.

Le Meur O. et al. 'Performance Assessment of a visual Attention System Entirely Based on a Human Vision Modeling: Image Processing, 2004. icip '04 2004 international conference on singapore Oct. 24-27, 2004, Piscataway, NJ, USA, iEEE, (Oct. 24, 2004), pp. 2327-2330, XP010786252 ISBN: 0-7803-8554-1 *alines '002!*.

Lee Y-H et al. "Perceptual Activity Measures Computed From Blocks in the Transform Domain" Signal Processing, Amsterdam, NL, vol. 82, No. 4, Apr. 2002 (23002-04), pp. 693-707, XP00434490788 ISSN: 0165-1684 *le document en entier*.

* cited by examiner

DEVICE AND METHOD FOR ANALYSING IMAGES BY CALCULATING THE VARIANCE FOR EACH PIXEL OF A HIGH-FREQUENCY IMAGE

This application claims the benefit, under 35 U.S.C. §119, of European Patent Application No. 0550026 filed 5 Jan. 2005.

FIELD OF THE INVENTION

The invention relates to a device and a method for analysing images.

BACKGROUND OF THE INVENTION

Devices for coding images are all the more effective as they code images possessing reduced temporal or spatial entropy.

They are therefore often associated with image pre-processing devices in which the images are processed in such a way as to allow better coding.

The aim of a video pre-processing is above all to increase the performance of an associated coding system, and this may manifest itself in 2 ways: improve the quality of the coded/decoded image for identical throughput, or decrease the coding throughput for identical image quality.

However, certain processing operations tend to reduce the definition of the image in an overly visible manner; it is therefore beneficial to establish effective control of these processing operations so as to best avoid these drawbacks.

The customary procedures for controlling spatial filters are often of a general kind: the sequence of images to be processed is characterized in a global manner and the severity of the filters is adjusted as a function of the result.

BRIEF DESCRIPTION OF THE INVENTION

The invention therefore proposes the local control, at the pixel level, of any definition or entropy reduction system, which operates in a spatial axis.

For this purpose, the invention relates to a device for analysing video images characterized in that it comprises:
  means of obtaining the high-frequency components of an image,
  means of obtaining a high-frequency image on the basis of the said high-frequency components,
  means of calculating the variance for each pixel of the said high-frequency image,
  means of associating a coefficient with each pixel of the image as a function of the said variance, the said coefficient being representative of the visual sensitivity of each pixel for the human eye.

According to the invention, the means of obtaining the high-frequency components comprise means of wavelet transformation of the said video signal.

Advantageously, the means of obtaining a high-frequency image comprise means of weighting the high-frequency images obtained by wavelet transformation, assigning a greater weighting to the high-frequency image representative of the diagonal contours.

Specifically, the eye fastens less easily onto diagonal contours than onto horizontal and vertical contours. Thus, it is advantageous to favour the components representative of the diagonal contours so as to be able to perform processing operations thereon subsequently.

In a preferred manner, the means of calculating the variance of each pixel define for each pixel a neighbourhood centred on the said pixel and calculate the mean deviation of the values of each pixel in the said neighbourhood.

According to a preferred embodiment, the device comprises means of slicing the scale of the variances into equal length spans, the means of associating a coefficient k with each pixel allocating a value to the said coefficient per span.

In a preferred manner, the means of associating a coefficient k modify the said coefficient as a function of the distance of the current pixel from the centre of the image.

Actually, the eye lingers longer on the central zones of the image and thus these zones must be favoured.

According to a preferred embodiment, the device comprises means of detecting zones with weak motion in the image.

In a preferred manner, the means of calculating a coefficient k for each pixel, decrease the said value of the coefficient k to a minimum value when the said pixel associated with the coefficient k belongs to a fixed zone.

The fixed zones of the image are zones that are particularly sensitive to the human eye. These zones are therefore zones in which it is preferably necessary to avoid undertaking processing operations which would modify the quality of the image in sensitive zones.

The invention also relates to a device for video pre-processing comprising means of entropy reduction on an incoming video signal, means of performing a mixing operation between the said incoming video signal and the video signal after entropy reduction characterized in that it comprises a device according to the invention, the said coefficient k performing a weighting between the incoming video signal and the video signal after entropy reduction in the means of mixing.

The invention also relates to a device for video coding characterized in that it comprises a device for analysing video images according to the invention, the said coefficient k making it possible to adjust the compression rate applied by the said coding device.

The invention also relates to a device for digital watermarking characterized in that it comprises a device for analysing video images according to the invention, the said coefficient k making it possible to determine the zone of the image containing the said watermarking.

The invention also relates to a method of analysing video images comprising:
  A step of obtaining the high-frequency components of an image,
  A step of obtaining a high-frequency image on the basis of the high-frequency components,
  A step of calculating the variance for each pixel of the said high-frequency image,
  A step of associating a coefficient k for each pixel of the image as a function of the said variance, the said coefficient being representative of the visual sensitivity of each pixel for the human eye.

BRIEF DESCRIPTION OF THE DRAWINGS

The invention will be better understood and illustrated by means of exemplary, advantageous, wholly nonlimiting modes of embodiment and implementation, with reference to the appended figures, in which.

DETAILED DESCRIPTION OF THE PREFERRED EMBODIMENT

Figure 1:
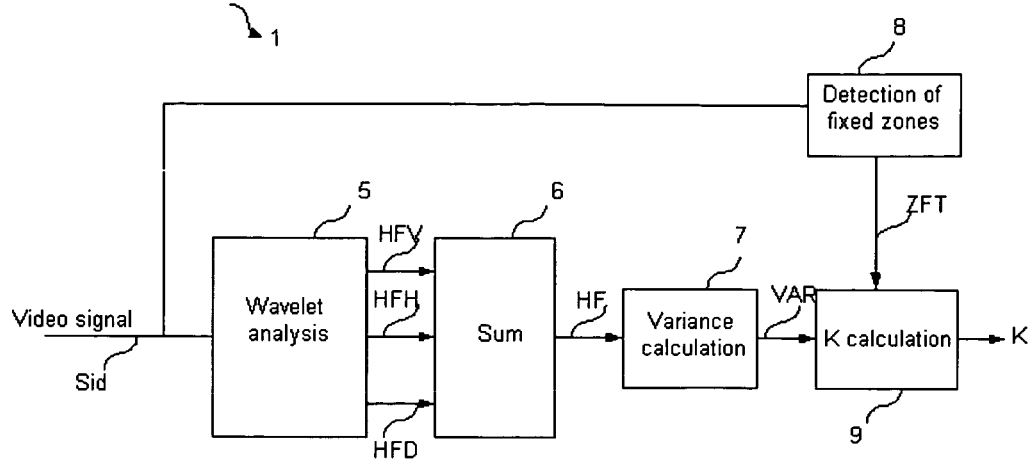
FIG. 1 represents an exemplary device according to the invention.

The modules represented are functional units, which may or may not correspond to physically distinguishable units. For example, these modules or some of them may be grouped together within a single component, or constitute functionalities of one and the same software. Conversely, certain modules may possibly be composed of separate physical entities.

The video signal Sid at the input of the precoding device is a video signal of interlaced type.

In order to improve the performance of the precoding device, the video signal Sid is deinterlaced. A deinterlacer doubles the number of lines per frame of a video signal Si by using a deinterlacing procedure known to the person skilled in the art based on three consecutive frames of the video signal Si. One then obtains progressive frames which each contain the complete vertical definition of an image making it possible to subsequently perform framewise comparisons, the respective lines of two consecutive frames being spatially at the same place in the image.

A wavelet analysis module 5 separates the various frequency components of the images of the deinterlaced video signal Si into subbands.

This wavelet analysis module comprises two mono-dimensional filters, a lowpass filter and a high-pass filter.

These two filterings are performed firstly on the lines then subsequently on the columns.

Following this filtering, four images are then available:
  an image for low frequencies,
  an image for high vertical frequencies, HFV,
  an image for high horizontal frequencies, HFH,
  an image for high diagonal frequencies, HFD.

The three high-frequency subimages, HFV, HFH, HFD are transmitted to a module 6 which sums them. Specifically, here we use the properties of the eye. The eye is less sensitive to degradations in the zones of the image with large spatial frequency. The texture, characterized by large spatial frequencies, acts as a masking signal and therefore makes it possible to mask any degradation. The zones with large spatial frequency are therefore charted. In these zones, it will therefore be possible in video coding applications for example, to reduce the entropy of the image and hence thus reduce the throughput without the image being degraded visually for the eye.

The module 6 computes a weighted sum of these three subimages to obtain an HF image.

This weighted sum is based on a property of the human visual system which causes the eye to fasten less easily onto diagonal contours than onto horizontal and vertical contours. The sensitivity of the eye is anisotropic.

The weighting therefore favours the HFD subimage by giving it a bigger weight than the HFV and HFD subimages.

$$\text{Image } HF=(A*HFV)+(B*HFH)+(C*HFD) \text{ with } C>B \text{ and } C>A.$$

The coefficients A, B, C are defined experimentally in the following way:
  $A=0.25$,
  $B=0.25$,
  $C=0.5$, In another embodiment, the coefficients A, B, C may be defined using a CSF curve (the acronym standing for "contrast sensitivity function"). An example of such a curve is defined in FIG. 2.

The CSF expresses the sensitivity of the eye in detecting a signal (the sensitivity is in fact the inverse of a value of contrast which brings about the first detection). Consequently, on looking at the curve, we note that:
  the sensitivity is a maximum for the low horizontal and vertical frequencies. This signifies that a signal characterized by a low frequency is detectable by the eye even with weak contrast. At larger frequencies, this contrast threshold increases strongly (zero sensitivity),
  additionally, at equivalent frequencies, the eye detects the signals on the vertical and horizontal components more easily than on the diagonal frequencies. On account of gravity, the eye is essentially confronted with horizontal/Vertical structures. The biological system has thus developed a hypersensitivity for these orientations.

In this invention, the human eye's weak sensitivity of detection on the diagonal components has been taken into account in order to more strongly degrade the diagonal structures of the image. The weighting parameters will therefore be deduced from a CSF curve that is standardized as follows:

$$A=B=1-\text{ValueCSFNorm}$$

$$C=1-\text{ValueCSFNorm}$$

The HF image thus obtained is transmitted to a module 7 which calculates the variance for each pixel of this HF image.

The module 7 chooses a neighbourhood about each pixel. This neighbourhood is a square of 5*5 pixels, centred on the current pixel. The module 7 then calculates the mean deviation of the luminance of the pixels in this neighbourhood. The result of this calculation gives an image of variance on a scale of 256 grey levels, where the amplitude of each pixel represents a texture level.

The variance image obtained is transmitted to a module 9 which calculates a coefficient k for each pixel of the image.

The coefficient k is representative of the severity of the processing which may be applied to the corresponding pixel. The larger the coefficient k, the more the corresponding pixel forms part of a zone with strong texture where the decrease in entropy will be especially beneficial for the coding.

For each pixel, a correspondence is made between the variance obtained and the coefficient k according to the following table:

TABLE 1

| Value of the variance VAR | Value of k |
| --- | --- |
| VAR = [0 ... 31] | 3/16 = Kmin |
| VAR = [32 ... 63] | 4/16 |
| VAR = [64 ... 95] | 5/16 |
| VAR = [96 ... 127] | 6/16 |
| VAR = [128 ... 159] | 8/16 |
| VAR = [160 ... 191] | 10/16 |
| VAR = [192 ... 223] | 12/16 |
| VAR = [224 ... 255] | 14/16 |

In order to obtain a smoothed map, it is important to take account of the neighbouring pixels. Actually, a pixel having a large coefficient k close to 1 cannot be surrounded by pixels having a zero label. The module 9 therefore applies a two-dimensional Gaussian lowpass filter to the coefficients k.

The following table gives an exemplary two-dimensional Gaussian filter to be applied to the coefficient k. It gives the values of coefficients to be applied to a window of 5 pixels by 5 pixels, a normalization factor of 1/1444 having to be applied.

TABLE 2

| 1 | 9 | 18 | 9 | 1 |
|---|---|---|---|---|
| 9 | 81 | 162 | 81 | 9 |
| 18 | 162 | 324 | 162 | 18 |
| 9 | 81 | 162 | 81 | 9 |
| 1 | 9 | 18 | 9 | 1 |

The module 9 also applies a Huber weighting so as to favour the central zone of the image that is particularly sensitive for the eye.

We let Kin(x,y) denote the value of k for the pixel with coordinates (x,y) following the application of the Gaussian filter and Kout(x,y) denote the value of k for this same pixel after applying the Huber weighting, $$Kout(x, y) = \left(1 - \frac{D}{d_{x_0,y_0}(x, y)}\right) Kin(x, y) \text{ for } d_{x_0,y_0}(x, y) > D$$

$$Kout(x, y) = 0 \text{ for } d_{x_0,y_0}(x, y) <= D$$

where
d represents the distance from the point (x,y) to the centre of the image $(x_0, y_0)$,
D represents a constant on the basis of which we wish to attenuate the signal. D defines for example a central zone of the image representing ⅛ of the total area.

The value kout(x,y) thus obtained for each pixel of the image is then validated by a module 8 which detects the fixed zones of the image.

The module 8 detects the zones with weak motion of the image and the zones with strong motion of the image. Specifically, another psycho-visual characteristic is that the zones that vary little temporally are those where the eye is apt to distinguish defects best. The coefficient k for the pixels in these zones must therefore be minimized.

The module 8 for detecting fixed zones receives as input the deinterlaced video signal sid.

The module 8 detects the fixed zones of the current frame with respect to the previous frame.

The module 8 comprises for this purpose a delay module for delaying the signal Si by a frame.

The detection of fixed zones consists in detecting the zones which from frame to frame or from image to image remain absent of motion. The detection of the fixed zones is performed on the basis of the luminance information and is performed on blocks of variable size. The mean error between the blocks of like coordinates of each frame is calculated. This error is compared with a predetermined threshold so as to validate or otherwise the fixed zone. The smaller the size of the blocks, the more accurate the analysis but the more sensitive it is to noise.

The fixed zones are not calculated for each pixel of the image but for blocks of 2*2 pixels, so as to ensure a degree of stability.

For bocks of 2*2 pixels, the mean of the error referred to the scale of a pixel (0 . . . 255) must not exceed 6, the value of the threshold.

The module 8 outputs a signal ZFT which indicates that the current pixel forms part of a so-called stationary zone that is fixed with respect to the previous frame.

The module 9 takes into account the signal ZFT in the following manner:
for each pixel not belonging to a fixed zone (ZFT=0), $k = k_{out}$,
for each pixel belonging to a fixed zone, $k = k_{min}$.

Figure 2:
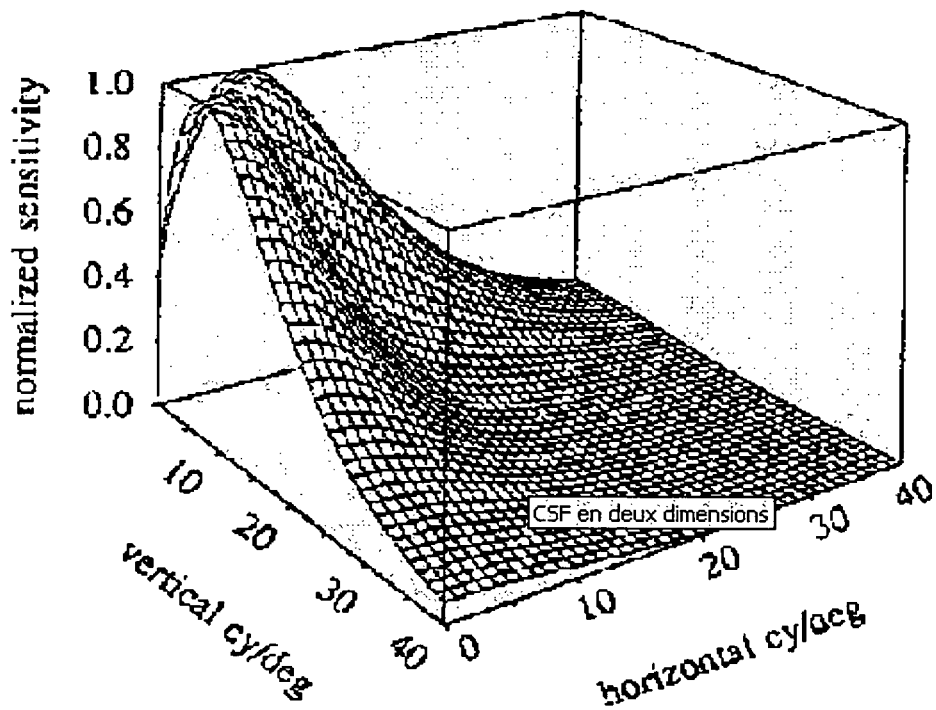
FIG. 2 represents a curve of sensitivity to contrast, used for the calculation of the weighting coefficients of the high-frequency images.
Figure 3:
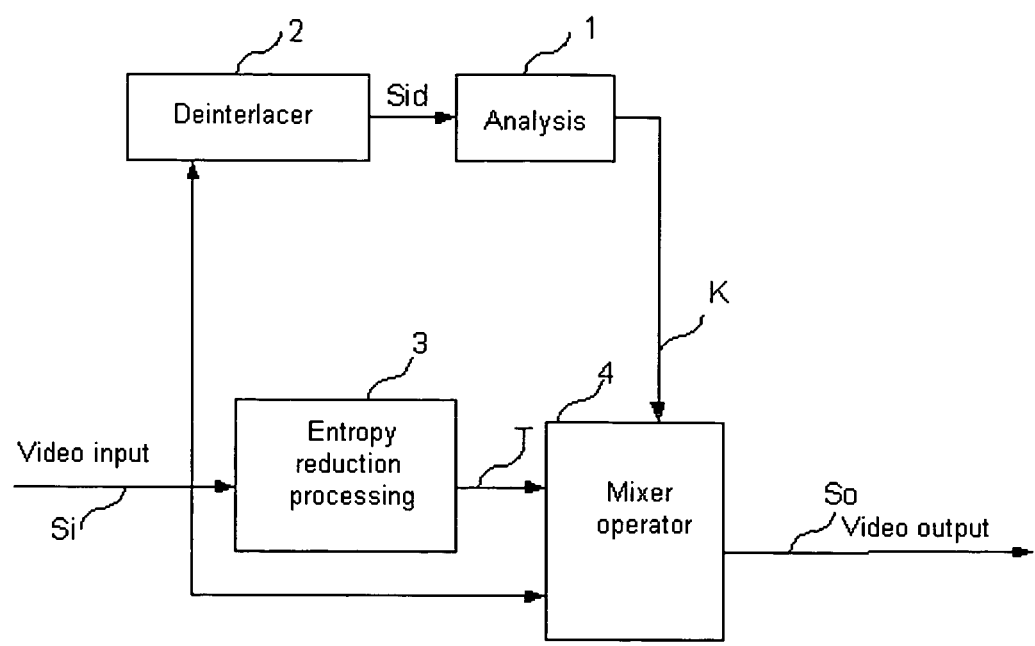
FIG. 3 represents an exemplary application of a device according to the invention.

FIG. 2 illustrates an exemplary embodiment in which the coefficient k calculated is used for video pre-processing.

A video signal Si is deinterlaced by a deinterlacing module 2. The deinterlacing module 2 outputs a deinterlaced signal Sid which enters an analysis module 1 as described in FIG. 1.

The analysis module 1 outputs a coefficient k for each pixel of the image.

An entropy reduction processing module 3 receives the signal Si as input.

The entropy reduction processing module 3 is advantageously constituted by morphological operators. Various methods known to the person skilled in the art make it possible to apply an entropy reduction.

A mixer operator 4 receives as input the coefficient k provided by the analysis module 1 as well as the video output of the entropy reduction module T.

The mixer operator 4 also receives the video signal Si as input. It performs the following operation:

$$So = k*T + (1-K)*Si$$

$S_o$ being the video output of the mixer operator.

Thus, if the value of k is large, the video signal after video pre-processing, represented here by an entropy reduction, is close to the signal T. A strong entropy reduction is therefore applied in respect of the zones that are less sensitive to degradations.

On the other hand, if the value of k is small, the video signal $S_o$ is close to the input signal and therefore undergoes a very small entropy reduction. A small entropy reduction is therefore applied in respect of the zones that are more sensitive to degradations.

In applications such as digital watermarking, the coefficient k is used to signal the zones in which it is preferable to place the watermark. When k is large, the zone is less sensitive to visual degradations and in this case, this zone may be chosen judicially so as to place a digital watermark therein.

In video coding applications, the coefficient k may serve to allocate more coding resources in the zones that are especially sensitive to the eye. By coding resource, it is for example possible to contemplate the use of a smaller quantization interval for these more sensitive zones.

Figure 4:
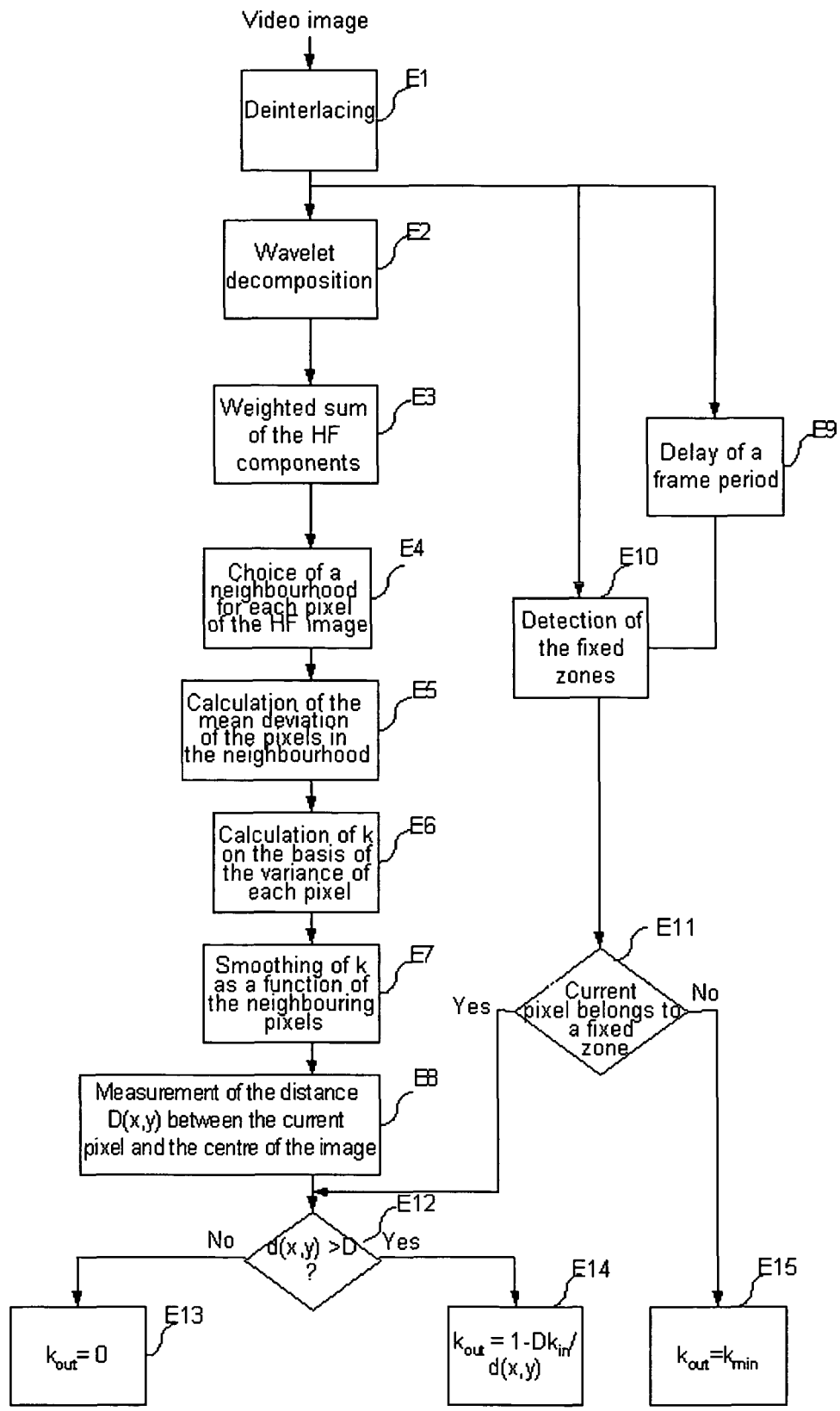
FIG. 4 represents an exemplary procedure according to the invention.

FIG. 4 represents an exemplary procedure according to the invention implemented in the analysis module 1.

In step E1, the input image is deinterlaced. During a step E2, the deinterlaced image is decomposed into wavelets so as to obtain the high-frequency components of the image. Other methods such as a discrete cosine transform make it possible to obtain the high-frequency components of the image.

During a step E3, the weighted sum of the high-frequency components of the image is calculated as described in FIG. 1.

During a step E4, a neighbourhood is chosen for each pixel of the image. According to the preferred embodiment, a neighbourhood of 5 pixels by 5 pixels, centred on the current point, is chosen.

During a step E5, the mean deviation of the pixels in the neighbourhood of each pixel of the high-frequency image is calculated.

During a step E6, a coefficient k is calculated for each pixel on the basis of the variance of the pixel as indicated previously in table 1.

During a step E7, the coefficient k is smoothed as a function of the value of k obtained for the neighbouring pixels. A two-dimensional Gaussian low-pass filter is therefore applied to the coefficients k.

During a step E8, the distance between the current pixel and the centre of the image is measured. Specifically, the centre of the image being a zone to which the eye is particularly drawn, this zone must be favoured in terms of image processing.

During a step E9, a delay of a frame is applied to the deinterlaced input image so as to calculate the motion vectors and to evaluate the motion in the image with respect to the previous frame.

During a step E10, the fixed zones in the image are detected on the basis of the motion information.

During a step E11, a test is performed to ascertain whether the current pixel belongs to a fixed zone.

If the test is negative, the current pixel does not belong to a fixed zone, so, during a step E15, the coefficient k for this pixel takes the minimum value of k, $k_{min}$.

If the test is positive, we then go to a step E12. During this step we go to a step E12 in which we test the distance between the centre of the image and the current pixel.

If the distance is less than a distance D, during a step E13, a zero value is allocated to the coefficient k associated with this pixel.

Otherwise, if the result of the test is positive, during a step E14, the following value is allocated to the coefficient k:

$$Kout(x, y) = \left(1 - \frac{D}{d_{x_0, y_0}(x, y)}\right) Kin(x, y)$$

What is claimed is:

1. Device for analysing video images wherein it comprises
   means of obtaining high-frequency components of a video image comprising means of wavelet transformation of said video image,
   means of obtaining a high-frequency image on the basis of said high-frequency components comprising means of weighting the wavelet transformation of said video image, assigning a greater weighting to a high-frequency image representative of diagonal contours,
   means of calculating a variance for each pixel of said high-frequency image,
   means of associating a coefficient with each pixel of the video image as a function of said variance, said coefficient being representative of a visual sensitivity of each pixel for a human eye.

2. Device according to claim 1 wherein the means of calculating the variance of each pixel define for each pixel a neighbourhood centred on said pixel and calculate a mean deviation of the values of each pixel in a neighbourhood.

3. Device according to claim 1 further comprising means of slicing a scale of the variances into equal length spans, wherein the means of associating said coefficient with each pixel allocates a value to said coefficient per span.

4. Device according to claim 3 wherein the means of associating said coefficient modify said coefficient as a function of a distance of a current pixel from the centre of the video image.

5. Device according to claim 3 further comprising means of detecting zones with weak motion in the video image.

6. Device according to claim 5 wherein the means of associating said coefficient for each pixel, decrease said value of said coefficient to a minimum value when said pixel associated with said coefficient belongs to a fixed zone.

7. Device according to claim 1, for video pre-processing comprising means of entropy reduction on an incoming video signal, means of performing a mixing operation between said incoming video signal and the video signal after entropy reduction, wherein said coefficient performing a weighting between the incoming video signal and the video signal after entropy reduction in the means of mixing.

8. Device according to claim 1, for video coding, wherein said coefficient making it possible to adjust a compression rate applied by said device for analysing images.

9. Device according to claim 1, for digital watermarking further comprising a device for analysing video images, wherein said coefficient making it possible to determine a zone of the image for containing a watermarking.

10. Method of analysing video images wherein it comprises
    obtaining high-frequency components of an image comprising means of wavelet transformation of said video image,
    obtaining a high-frequency image on a basis of said high-frequency components wherein the wavelet transformation of said video image is weighted by assigning a greater weighting to a high-frequency image representative of diagonal contours,
    calculating a variance for each pixel of said high-frequency image,
    associating a coefficient for each pixel of the image as a function of said variance, said coefficient being representative of a visual sensitivity of each pixel for a human eye.

* * * * *